United States Patent
Cohen (10) Patent No.: US 10,229,114 B2
(45) Date of Patent: Mar. 12, 2019

(54) CONTEXTUAL LANGUAGE TRANSLATION

(71) Applicant: Google LLC, Mountain View, CA (US)

(72) Inventor: Tal Cohen, Atlit (IL)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/825,276

(22) Filed: Nov. 29, 2017

(65) Prior Publication Data

US 2018/0322117 A1 Nov. 8, 2018

(30) Foreign Application Priority Data

May 3, 2017 (IL) .......................................... 252071

(51) Int. Cl.
| | |
|---|---|
| *G06F 17/27* | (2006.01) |
| *G06F 17/28* | (2006.01) |
| *G10L 13/02* | (2013.01) |
| *G10L 15/26* | (2006.01) |
| *G10L 15/22* | (2006.01) |
| *G06F 9/451* | (2018.01) |

(52) U.S. Cl.
CPC ............ *G06F 17/289* (2013.01); *G06F 9/454* (2018.02); *G06F 17/2785* (2013.01); *G06F 17/2881* (2013.01); *G10L 13/02* (2013.01); *G10L 15/22* (2013.01); *G10L 15/26* (2013.01)

(58) Field of Classification Search
CPC ..... G06F 17/28; G06F 17/289; G06F 17/2785
See application file for complete search history.

(56) References Cited

U.S. PATENT DOCUMENTS 4,984,177 A 1/1991 Rondel et al.
5,466,072 A * 11/1995 McCready ................. B41J 3/26
400/91

(Continued)

FOREIGN PATENT DOCUMENTS

EP 3139378 3/2017

OTHER PUBLICATIONS

'youtube.com' [Online Video] "Translate by Amazon Echo dot," posted on Dec. 2, 2016, [retrieved on Nov. 16, 2017] Retrieved from Internet: URL<https://www.youtube.com/watch?v=1WrGTU7kB6s> 2 pages.

(Continued)

*Primary Examiner* — Eric Yen
(74) *Attorney, Agent, or Firm* — Fish & Richardson P.C.

(57) ABSTRACT

Methods, systems, and apparatus, including computer programs encoded on a computer storage medium, for contextual language translation. In one aspect, a method includes the actions of receiving a first text string. The actions further include generating a first translation of the first text string. The actions further include providing, for output, the first translation of the first text string. The actions further include receiving a second text string. The actions further include generating a combined text string by combining the first text string and the second text string. The actions further include generating a second translation of the combined text string. The actions further include providing, for output, a portion of the second translation that includes a translation of the second text string without providing, for output, a portion of the second translation that includes a translation of the first text string.

20 Claims, 5 Drawing Sheets

(56) References Cited

U.S. PATENT DOCUMENTS

| | | | | |
|---|---|---|---|---|
| 5,797,011 | A * | 8/1998 | Kroll | G06F 9/454 |
| | | | | 717/137 |
| 5,815,639 | A * | 9/1998 | Bennett | G06F 17/24 |
| | | | | 348/E7.081 |
| 5,903,858 | A * | 5/1999 | Saraki | G06F 17/2872 |
| | | | | 704/2 |
| 6,041,293 | A * | 3/2000 | Shibata | G06F 17/2818 |
| | | | | 704/4 |
| 6,516,296 | B1 * | 2/2003 | Fuji | G06F 17/2735 |
| | | | | 704/3 |
| 7,483,832 | B2 | 1/2009 | Tischer | |
| 8,024,196 | B1 | 9/2011 | Wodtke et al. | |
| 8,103,508 | B2 | 1/2012 | Lord | |
| 8,290,779 | B2 | 10/2012 | Hoefelmeyer et al. | |
| 8,326,596 | B2 | 12/2012 | Cohen | |
| 8,527,280 | B2 | 9/2013 | Boesen | |
| 8,965,759 | B2 | 2/2015 | Hershenhorn | |
| 9,600,474 | B2 | 3/2017 | Cuthbert et al. | |
| 9,710,464 | B1 | 7/2017 | Undavalli | |
| 2003/0014238 | A1 * | 1/2003 | Xun | G06F 17/271 |
| | | | | 704/4 |
| 2003/0069879 | A1 * | 4/2003 | Sloan | G06F 17/22 |
| 2004/0186732 | A1 * | 9/2004 | Okura | G06F 17/2836 |
| | | | | 704/277 |
| 2008/0133245 | A1 | 6/2008 | Proulx et al. | |
| 2009/0024599 | A1 * | 1/2009 | Tata | G06F 17/275 |
| 2009/0083023 | A1 * | 3/2009 | Foster | G06F 17/2827 |
| | | | | 704/3 |
| 2012/0022852 | A1 * | 1/2012 | Tregaskis | G06F 17/2836 |
| | | | | 704/3 |
| 2012/0035907 | A1 * | 2/2012 | Lebeau | G06F 17/28 |
| | | | | 704/2 |
| 2013/0103383 | A1 * | 4/2013 | Du | G06F 3/0488 |
| | | | | 704/3 |
| 2014/0297257 | A1 | 10/2014 | Shin et al. | |
| 2015/0051898 | A1 * | 2/2015 | Cuthbert | G06F 3/167 |
| | | | | 704/3 |
| 2015/0058023 | A1 | 2/2015 | Goo | |
| 2015/0310290 | A1 * | 10/2015 | Cuthbert | G06F 17/289 |
| | | | | 382/182 |

OTHER PUBLICATIONS

International Search Report and Written Opinion issued in International Application No. PCT/US2018/013351, dated Apr. 3, 2018, 16 pages.
Khoury. "Microsoft Translator and Google Translate Compared: Is There a New Challenger in the House?", Aug. 10, 2015, [retrieved on Mar. 22, 2018] Retrieved from Internet: URL<http://web.archive.org/web/20150810094908/http://www.androidpolice.com/2015/08/09/microsoft-translator-and-google-translate-compared-is-ther-a-new-challenger-in-the-house/> 17 pages.
Shrawankar et al. "Techniques for Feature Extraction in Speech Recognition System: A Comparative Study," arXiv 1305.1145, May 6, 2013, 9 pages.
Wang et al. "Exploiting Cross-Sentence Context for Neural Machine Translation," arXiv 1704.04347v2, Apr. 14, 2017, 5 pages.
PCT Written Opinion issued in the International Application No. PCT/US2018/013351, dated Aug. 21, 2018, 8 pages.

* cited by examiner

CONTEXTUAL LANGUAGE TRANSLATION

CROSS-REFERENCE TO RELATED APPLICATION

This application claims the benefit of Israeli Patent Application No. 252071, filed May 3, 2017, which is incorporated by reference.

FIELD

This specification generally relates to automated language translation.

BACKGROUND

Translation involves the conversion of a first phrase in one language to a second phrase in another language, such that the first phrase and the second phrase have substantially the same meaning.

SUMMARY

When translating between languages, an automated translation system may have difficulty translating words without sufficient contextual information. A word in one language may have two corresponding words in a different language. For example, "to be" in English may translate to "ser" or "estar" in Spanish depending on the usage. Additionally, in some languages nouns for inanimate objects may have a gender, and any adjectives describing that noun take on the same gender as the noun. For example, white chair may translate to "silla blanca" in Spanish, and white desk may translate to "escritorio blanco". In these two examples, "blanco" and "blanca" both translate to "white," but take on the gender of the noun which each modifies.

An automated translation system may have difficulty translating gender neutral words to languages where almost all nouns have a gender. For example, a user may ask an automated translation system to translate, "I bought a chair," from English to Spanish. The automated translation system may determine that the Spanish translation is, "Compré una silla." The user may then ask the automated translation system to translate, "It is white." The automated translation system may determine that the Spanish translation is, "Es blanco," when the correct translation is, "Es blanca." The adjective "blanca" takes its feminine form because it modifies the noun "silla" which is feminine.

To improve translation accuracy, an automated translation system may use previous translations to provide context for subsequent translations. In the example above, the automated translation system may use the context from "Compré una silla" to determine that the appropriate translation of the subsequent portion is "Es blanca." The context may include information such as gender of nouns, verb tenses, and other related information. To ensure that an automated translation system uses the context of the previously translated portions, the automated translation system may receive text that it has already translated to the target language in addition to the new text to translate. For example, instead of the automated translation system receiving "It is white" to translate, the automated translation system receives "I bought a chair. It is white." Providing the previously translated text may assure that the automated translation system uses the context from previous portions of the text. When presented to the user, a system may remove the translated portion that was already provided to the user. For example, a system may remove "Compré una silla" and only provide "Es blanca."

According to an innovative aspect of the subject matter described in this application, a method for contextual language translation includes the actions of receiving a first text string that is in a first language; generating a first translation of the first text string from the first language to a second language; providing, for output, the first translation of the first text string; after providing, for output, the first translation of the first text string, receiving a second text string that is in the first language; generating a combined text string by combining the first text string that is in the first language and the second text string that is in the first language; generating a second translation of the combined text string from the first language to the second language; and providing, for output, a portion of the second translation that includes a translation of the second text string without providing, for output, a portion of the second translation that includes a translation of the first text string.

These and other implementations can each optionally include one or more of the following features. The actions further include receiving a command to enter a mode for translating text strings from the first language to the second language. The first translation and the second translation are generated based on the command to enter the mode for translating text strings from the first language to the target language. The command to enter the mode for translating text strings from the first language to the second language is preceded by a predefined hotword. The first text string and the second text string are not preceded by the predefined hotword. The action of generating a second translation of the combined text string from the first language to the second language includes determining a translation context based the first text string, and generating the second translation based on the translation context. The actions further include receiving a command to exit a mode for translating text strings from the first language to the second language; and receiving a third text string and not generating a third translation of the third text string based on the command to exit the mode for translating text strings from the first language to the second language. The command to exit the mode for translating text strings from the first language to the second language is preceded by a predefined hotword. The action of generating a combined text string by combining the first text string that is in the first language and the second text string that is in the first language includes concatenating the first text string that is in the first language and the second text string that is in the first language.

Other embodiments of this aspect include corresponding systems, apparatus, and computer programs recorded on computer storage devices, each configured to perform the operations of the methods.

The subject matter described in this application may have one or more of the following advantages. A computing device may translate more accurately by utilizing the context of previous portions of the original text. A computing device translate audio data received through the microphone without requiring a command and/or a hotword to precede each utterance. The computing device may use less battery and processing power when translating because a user may not need to perform reverse translations, e.g., translating the output of a translation application back to the original language, to ensure the accuracy of a translation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference numbers represent corresponding parts throughout.

DETAILED DESCRIPTION

Figure 1:
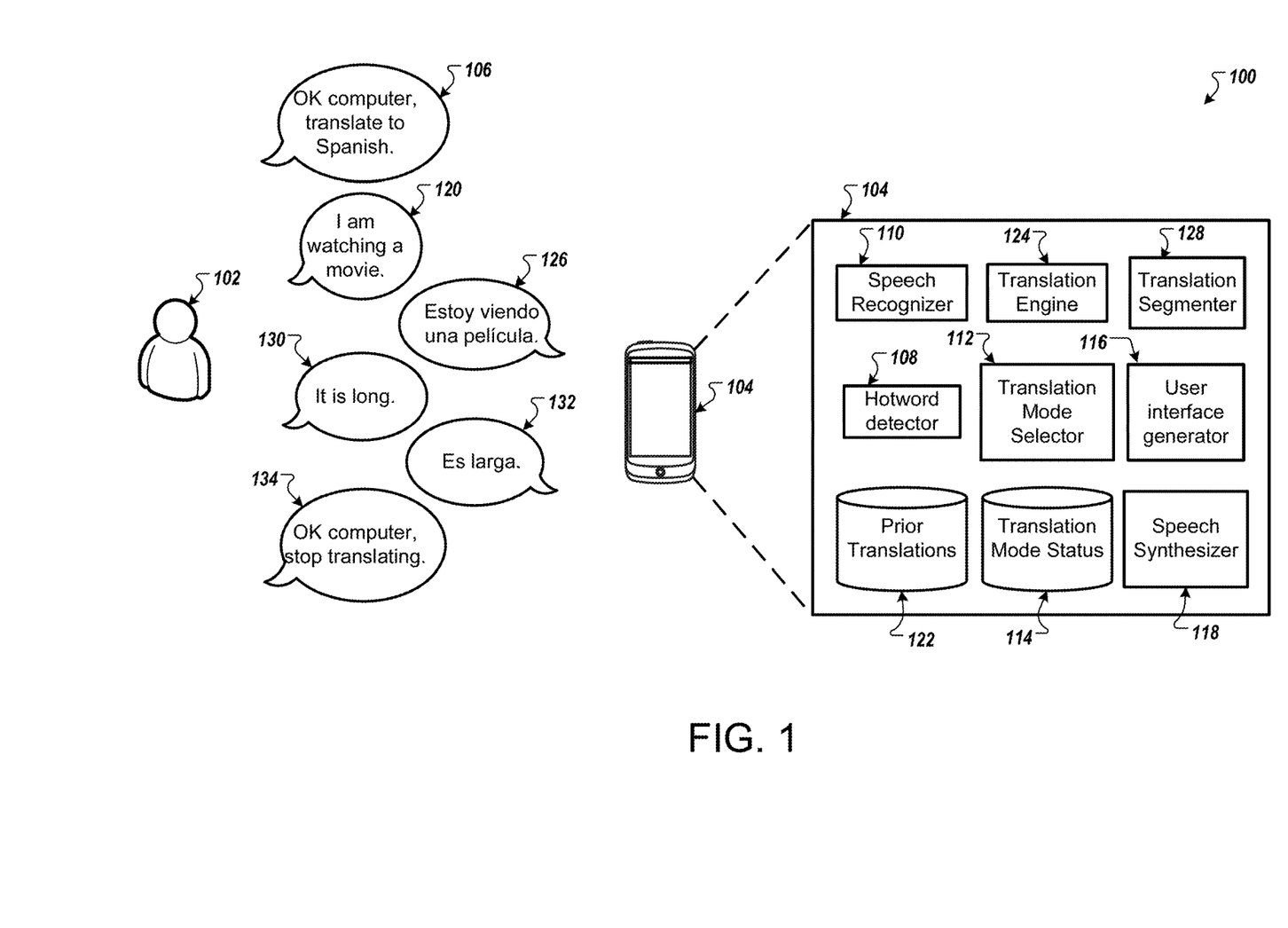
FIGS. 1 and 2 illustrate example systems for contextual language translation.

FIG. 1 illustrates an example system 100 for contextual language translation. Briefly, and as described in more detail below, the user 102 provides an instruction to computing device 104 to enter a translation mode. The user 102 speaks utterances 120 and 130 to the computing device 104, and the computing device 104 returns a translation of the text of the utterance 106. The computing device 104 uses the context from initial portions of the text to increase the accuracy of the translation of later portions of the text.

In more detail and as illustrated in FIG. 1, the user 102 speaks utterance 106 while the user 102 is in the vicinity of computing device 104. A microphone of the computing device 104 receives the utterance 106 and processes the audio data that corresponds to the utterance 106. The initial processing of the audio data may involve filtering the audio data and converting the audio data from an analog signal to a digital signal. For example, the user 102 may speak utterance 106, "Ok computer, translate to Spanish." The microphone of the computing device detects the "Ok computer, translate to Spanish" utterance, filters it, and converts it to a digital signal. The computing device 104 may be any type of device that is configured to receive and process text or speech. For example, the computing device 104 may be a phone, tablet, laptop computer, desktop computer, smart speaker, television, in-car system, watch, or any other similar device.

As the computing device 104 processes the audio data, the computing device may store the audio data in a buffer for additional processing. With the audio data in the buffer, the computing device 104 may identify whether the audio data includes any spoken words. One way the computing device 104 identifies spoken words is to use a hotword detector 108. The hotword detector 108 is configured to identify hotwords that are included in the audio data.

A hotword, which by agreement among the users in an environment, is reserved as a predetermined word that is spoken to invoke the attention of the system. In an example environment, the hotword used to invoke the system's attention are the words "OK computer." Consequently, each time the words "OK computer" are spoken, it is picked up by a microphone, conveyed to the system, which performs speech modeling techniques to determine whether the hotword was spoken and, if so, awaits an ensuing command or query. Accordingly, utterances directed at the system take the general form [HOTWORD] [QUERY], where "HOTWORD" in this example is "OK computer" and "QUERY" can be any question, command, declaration, or other request that can be speech recognized, parsed and acted on by the system, either alone or in conjunction with the server via the network.

In some implementations, the hotword detector 108 may be configured to identify hotwords that are in the initial portion of the utterance 106. In this example, the hotword detector 108 may determine that the utterance 106 "Ok computer, translate to Spanish" includes the hotword "ok computer" if the hotword detector 108 detects acoustic features in the audio data that are characteristic of the hotword "ok computer." The acoustic features may be mel-frequency cepstral coefficients (MFCCs) that are representations of short-term power spectrums of the utterance or may be mel-scale filterbank energies for the utterance 106. For example, the hotword detector 108 may detect that the utterance 106 "Ok computer, translate to Spanish" includes the hotword "ok computer" based on generating MFCCs from the audio data and classifying that the MFCCs include MFCCs that are similar to MFCCs that are characteristic of the hotword "ok computer." As another example, the hotword detector 108 may detect that the utterance 106 "Ok computer, translate to Spanish" includes the hotword "ok computer" based on generating mel-scale filterbank energies from the audio data and classifying that the mel-scale filterbank energies include mel-scale filterbank energies that are similar to mel-scale filterbank energies that are characteristic of the hotword "ok computer."

In some implementations, the hotword detector 108 may process the audio data before the speech recognizer 110 processes the audio data. For example, the hotword detector 108 may identify the audio portions that include a hotword for the audio data corresponding to utterance 106 and provide those portions that do not include a hotword to the speech recognizer 110. In this example, the hotword detector 108 may provide the portion of the audio data that corresponds to "translate to Spanish" to the speech recognizer 110.

The speech recognizer 110 processes the received audio data and identifies a likely transcription that corresponds to the audio data. For example, the speech recognizer 110 receives audio data that corresponds to "translate to Spanish" and generates the transcription "translate to Spanish" based on various language models and acoustic models. In some implementations, the speech recognizer 110 is executed by the computing device 104. In some implementations, the speech recognizer 110 is executed by another computing device, such as a server. In this instance, the computing device 104 provides the audio data to the server, the speech recognizer of the server processes the audio data, and the server sends the transcription to the computing device 104.

The translation mode selector 112 receives the transcription "translate to Spanish" and sets the translation mode status 114 to translate to Spanish. The translation mode selector 112 may also identify the language of the received transcription and update the translation mode status 114 accordingly. For example, the translation mode selector 112 may identify the language of "translate to Spanish" as English and set the translation mode status 114 to English to Spanish. In some implementations, the translation mode selector 112 may receive data identifying the language of the transcription along with the transcription. For example, the translation mode selector 112 receives the transcription "translate to Spanish" and data identifying the language as English.

In some implementations, the computing device 104 may provide an indication to the user of the translation mode status. For example, the user interface generator 116 may generate a user interface indicating that the computing device 104 is currently in a mode to translate English to Spanish. The user interface generator 116 may provide the generated interface to a display of the computing device 104. As another example, the speech synthesizer 118 may generate synthesized speech of the translation mode status 114 and provide the synthesized speech to a speaker of the computing device 104. The synthesized speech may be, "Translating English to Spanish."

In the example shown in FIG. 1, the user 102 speaks utterance 120. The computing device 104 receives the utterance 120 through the microphone and processes the audio data corresponding to the utterance 120 in a similar fashion to the processing of the audio data corresponding to the utterance 106. For example, the hotword detector 108 determines whether there is a predefined hotword in the audio data corresponding to the utterance 120 and the speech recognizer 110 generates a transcription of the audio data.

The computing device 104 access the translation mode status 114 and determines that the computing device 104 is in translation mode from English to Spanish. The computing device 104 determines that because the audio data corresponding to the utterance 120 did not include a predefined hotword, the computing device 104 does not update the translation mode status 114. The computing device accesses the prior translations 122. The prior translations 122 include any text that was previously transcribed or received since the command to begin translation. In some implementations, the computing device 104 clears the prior translations 122 upon receiving the command to enter a translation mode. For example, the computing device 104 may clear the prior translations 122 upon receiving the utterance 106 and identifying the command "translate to Spanish." In the example of FIG. 1, because the computing device 104 did not receive or transcribe any text before utterance 120, the prior translations 122 is empty.

The computing device 104 provides the transcribed text to the translation engine 124. The translation engine 124 is configured to translate the transcribed text into the target language. The translation engine 124 may be configured to translate multiple languages into multiple target languages. In this case, the computing device 104 may provide the transcribed text along with a command to translate from English to Spanish.

The translation engine 124 generates the translation of utterance 120, "I am watching a movie" to the text 126, "Estoy viendo una película." The user interface generator 116 may display the text 126 on the display of the computing device 104. Additionally, or alternatively, the speech synthesizer 118 may synthesize speech of the text 126 and provide the synthesized speech to the speaker of the computing device 104.

To ensure that the user interface generator 116 or the speech synthesizer 118 provides a translation of the previously provided text, the computing device 104 provides the translated text outputted by the translation engine 124 to the translation segmenter 128. The translation segmenter 128 removed segments of the translation that the computing device 104 already provided to the user 102. The translation segmenter 128 may check the translations stored in the prior translations 122 and remove any translations provided to the user 102.

The computing device 104 updates the prior translations 122 with the text of utterance 120 and the text of transcription 126. The prior translations 122 may store additional details related to the translations including a timestamp that corresponds to the time of receipt of the utterance 120. In some implementations, the prior translations 122 may automatically clear the stored translations after a particular amount of time. For example, the prior translations 122 may clear the stored translations after two minutes.

The user 102 speaks the utterance 130. The computing device 104 receives the utterance 130 through the microphone and processes the audio data corresponding to the utterance 130 in a similar fashion to the processing of the audio data corresponding to the utterance 106. For example, the hotword detector 108 determines whether there is a predefined hotword in the audio data corresponding to the utterance 120 and the speech recognizer 110 generates a transcription of the audio data. In the example shown in FIG. 1, the user 102 speaks, "It is long," and the speech recognizer identifies the corresponding transcription.

The computing device 104 access the translation mode status 114 and determines that the computing device 104 is in translation mode from English to Spanish. The computing device 104 determines that because the audio data corresponding to the utterance 130 did not include a predefined hotword, the computing device 104 does not update the translation mode status 114, which is translate to Spanish. The computing device 104 accesses the prior translations 122. The prior translations 122 include any text that was previously transcribed or received since the command to begin translation.

In the example shown in FIG. 1, the prior translations 122 include the text of utterance 120 and the text of translation 126. The computing device 104 combines the text from utterance 120 with the text from utterance 130 and provides the text combination to the translation engine 124. For example, the computing device 104 combines "I am watching a movie" with "It is long," and provides the text "I am watching a movie. It is long," to the translation engine 124.

The translation engine 124 translates the entire text of "I am watching a movie. It is long" into Spanish. The translation engine 124 may use the context of initial portions of the received text to translate later portions of the received text. The context may include words that may have a particular gender, nouns, verb tenses, and any other related context that may assist in more accurately translating later portions. In this example, the translation engine 124 translates "I am watching a movie" to "Estoy viendo una película." The translation engine 124 may store "una película" as context data because it is a noun with a feminine gender. The translation engine 124 may also store data indicating that the sentence is in the present tense. The translation engine 124 continues to translate "It is long." Based on the previous context, the translation engine 124 identifies the pronoun "it" as referring to the noun "una película." In this case, the translation engine 124 translates "It is long" to "Es larga" where "larga" is the feminine version of the translation of "long" because "larga" modifies the feminine noun "una película." Without the context data a typical translation of "It is long" would be "Es largo" where the translation engine 124 default to the masculine version of the translation of "long."

The computing device 124 provides the translation from the translation engine 124 to the translation segmenter 128. The translation segmenter 128 removes portions of the translated text already provided to the user 102. The translation segmenter 128 identifies portions of the translated text already provided to the user 102 by comparing the translated text to the prior translations 122. For example, the translation segmenter 128 receives, "Estoy viendo una película. Es larga." The translation segmenter 128 access the prior translations 122 which includes the translation of "I am watching a movie" to "Estoy viendo una película." The translation segmenter 128 determines that the translated text "Estoy viendo una película" was already provided to the user 102 and removes the portion from the translated text. The remaining translated text of "Es larga" is provided to the user 102.

In some implementations, the translations segmenter 128 may receive both the translated text and the text provided by the user 102. Receiving both the translated text and the text provided by the user 102 may assist the translations segmenter 128 in identifying portions of the translated text that were already provided to the user 102 in instances where the translated portion does not exactly match text stored in the prior translations 122. For example, "It is long" may initially be translated to "Es largo." In a subsequent translation, the translation engine 124 may translate "It is long" to "Es larga." The translations segmenter 128 identifies that "Es larga" was already provided to the user 102 even though "Es larga" is not in the prior translations 122 by matching the untranslated text of "It is long" to text that was already provided to the user 102.

In some implementations, the text input to the translation engine 124 may be colored or marked to indicate the new portions of text that have not been sent to the translation engine 124. The translation engine 124 may retain the markings when translating the text and return marked text that indicates the new portions. For example, the computing device 104 may send "I am watching a movie. <new> It is long. </new>" to the translation engine 124. The translation engine 124 may return "Estoy viendo una película. <new> Es larga. </new>." The translation segmenter 128 may then identify the "Es larga" portion as the new portion and provide that portion back to the user 102.

The computing device 104 receives "Es larga" from the translation segmenter 128 and provides the translated text to the user 102. The user interface generator 116 may generate an interface that includes "Es larga" and provide the interface to a display of the computing device 104. Alternatively, or additionally, the speech synthesizer 118 may generate synthesized speech 132 of "Es larga" and provide the synthesized speech 132 to a speaker of the computing device 104.

The user 102 speaks the utterance 134. The computing device 104 receives the utterance 134 through the microphone and processes the audio data corresponding to the utterance 134 in a similar fashion to the processing of the audio data corresponding to the utterances 106, 120, and 130. For example, the hotword detector 108 determines whether there is a predefined hotword in the audio data corresponding to the utterance 134 and the speech recognizer 110 generates a transcription of the audio data. In the example shown in FIG. 1, the user 102 speaks, "OK computer, stop translating." The hotword detector 108 identifies the hotword "Ok computer," and the speech recognizer 110 generates the transcription "stop translating."

Based on the hotword "ok computer," the computing device 104 determines that the following transcription likely corresponds to a command. The computing device provides the text corresponding to the portion of the utterance 134 after the hotword to the translation mode selector 112. The translation mode selector 112 receives the transcription "stop translating" and sets the translation mode status 114 to "not translating."

In some implementations, the computing device 104 may provide an indication to the user 102 of the translation mode status. For example, the user interface generator 116 may generate a user interface indicating that the computing device 104 is not is translation mode. The user interface generator 116 may provide the generated interface to a display of the computing device 104. As another example, the speech synthesizer 118 may generate synthesized speech of the translation mode status 114 and provide the synthesized speech to a speaker of the computing device 104. The synthesized speech may be, "exiting translation mode."

In some implementations, the user 102 provides text to the computing device 104 in ways other than speaking. For example, instead of speaking utterance 120, the user may type "I am watching a movie" using a keyboard of the computing device 104. As another example, the user 102 may link to a document that includes the text "I am watching a movie" using an application running on the computing device 104. The computing device may translate the text is a similar fashion compared to the user speaking the utterances 120 and 130.

In some implementations, the computing device 104 may be configured to translate between the default language of the computing device 104 and another language. For example, the default language of the computing device 104 may be English. The default language is the language that the computing device 104 primarily operates in. The user may request that the computing device 104 translate from Spanish to French. In this example, the user 102 may speak, "Ok computer, translate from Spanish to French" in English or whatever the default language is. The user 102 proceeds to speak utterances in Spanish and the computing device 104 translates the Spanish utterances to French.

In some implementations, different elements of computing device 104 may be implemented on a remote server. For example, the speech recognizer 110 and/or the translation engine 124 may be implemented on a server. The server may communicate with the computing device 104 over a network. In some implementations, any combination of the elements illustrated in FIG. 1 for computing device 104 may be implemented on a server.

In some implementations, subsequent speech or text received from the user 102 may provide additional context for previously translated text. For example, the user 102 may speak, "I met my teacher today." The computing device 104 may translate "teacher" to "profesor." The user 102 may then speak, "She said hello." Based on the context provided by the subsequent utterance where the user 102 referred to the teacher as a female, the computing device should have translated "teacher" to "profesora."

In this instance, the computing device 104 may handle the situation using one of several techniques. The first option may be for the computing device 104 to provide no correction. The computing device 104 provides the translation of, "I met my teacher today," and the provides the translation of, "She said hello" without addressing the prior gender error for teacher. The second option may be for the computing device 104 to generate synthesized speech or visual output indicating that the previous text should be corrected. For example, the system may generate synthesized speech stating that, "Ah, 'profesor' should be 'profesora' in the previous translation." The synthesized speech may also include the full corrected translation of the previous utterance. The synthesized speech may provide some type of tonal emphasis to the corrected word.

The computing device 104 may use the third option when the computing device 104 uses the user interface generator 116 to provide the translation. For example, the user interface generator 116 may replace "professor" with "profesora" in the translated text on the screen. The user interface generator 116 may highlight or bold the corrected text.

In some implementations, using the coloring or marking technique described above, the computing device 104 may be able to more easily identify the translated text that corresponds to the most recent utterance even in instances where the previous translated text is corrected. For example, the text, "She said hello" may be marked and the translation that text will also be marked. In the same translation, the translation engine 124 will also change "profesor" to "profesora." This text may appear to be new text because it was not part of the previous translation, but the markings will assist the computing device 104 in handing the correction by identifying the translated text that corresponds to the most recent utterance.

Figure 2:
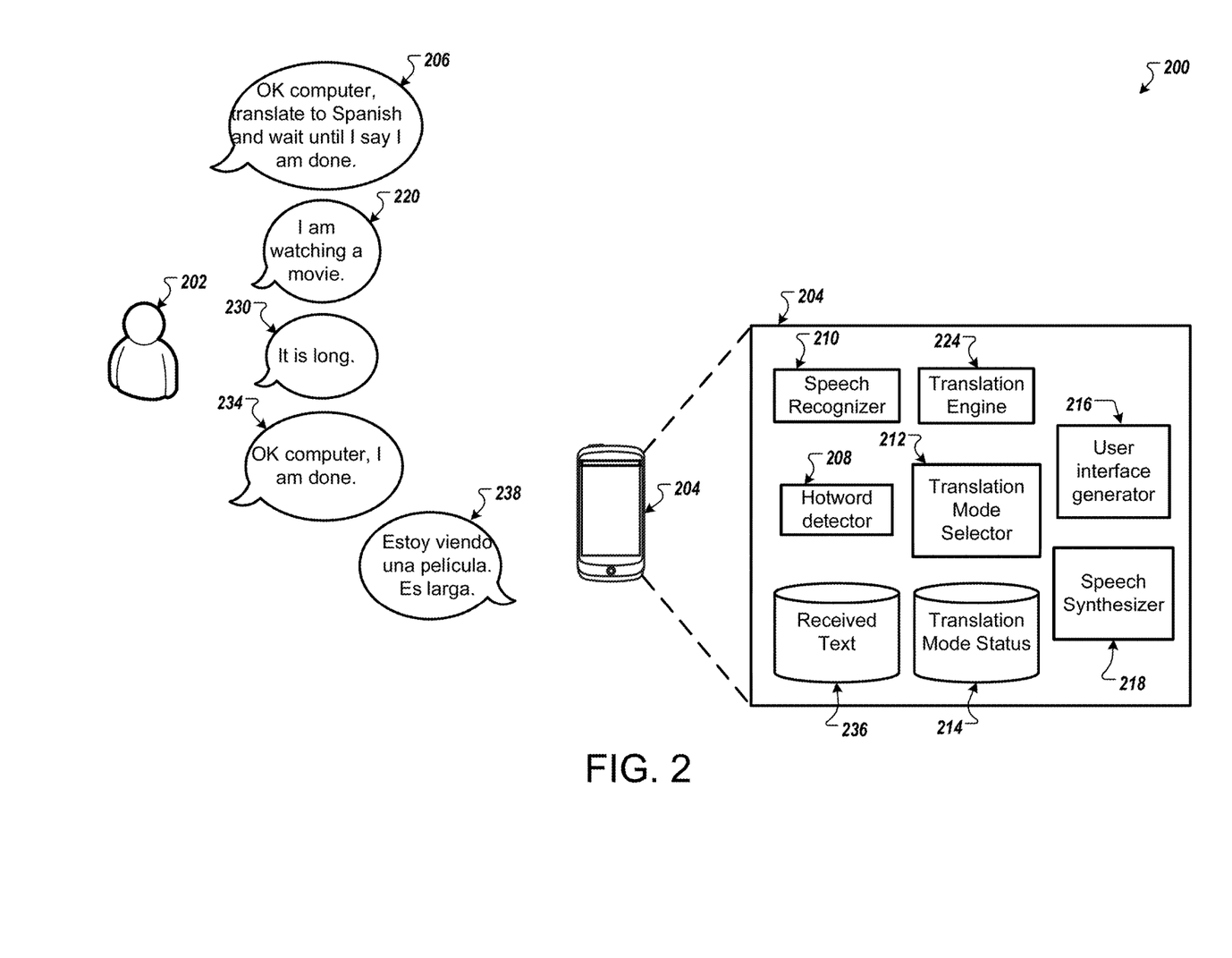

FIG. 2 illustrates an example system 200 for contextual language translation. Briefly, and as described in more detail below, the user 202 provides an instruction to computing device 204 to enter a translation mode. The user 202 provides text to the computing device 204 by speaking utterances 220 and 230, and the computing device 204 returns a translation of the text. The computing device 204 uses the context from initial portions of the text to increase the accuracy of the translation of later portions of the text.

In more detail and as illustrated in FIG. 2, the user 202 speaks utterance 206 while the user 202 is in the vicinity of computing device 204. A microphone of the computing device 204 receives the utterance 206 and processes the audio data that corresponds to the utterance 206. The initial processing of the audio data may involve filtering the audio data and converting the audio data from an analog signal to a digital signal. For example, the user 202 may speak, "OK computer, translate to Spanish and wait until I say I am done." The microphone of the computing device detects the utterance, filters it, and converts it to a digital signal.

Similar to computing device 104, the computing device 204 includes a hotword detector 208 and speech recognizer 210. The hotword detector 208 is configured to identify predefined hotwords in the audio data. The speech recognizer is configured to generate a transcription of the audio data. In the example of FIG. 2, the hotword detector 208 detects the predefined hotword of "Ok computer." The speech recognizer 210 transcribes "translate to Spanish and wait until I say I am done."

Because the utterance 206 includes a predefined hotword, the computing device 204 provides the text of the portion of the utterance 206 following the hotword to the translation mode selector 212. The translation mode selector 212 receives the command "translate to Spanish and wait until I say I am done." The translation mode selector 212 sets the translation mode status 214 to translate to Spanish. The translation mode selector 212 also sets a stop command of "I am done." The translation mode selector 212 will listen for the stop command to determine when to stop translating and provide the translated text to the user 202.

In some implementations, the computing device 204 may have a default stop command. For example, the default stop command may be "stop." In this instance, the user may say, "Ok computer, translate to Spanish." The translation mode selector 212 sets the translation mode status 214 to translate to Spanish. The translation mode selector 212 also sets a stop command of "stop" because the user did not provide a custom stop command within the utterance 206.

In some implementations, the computing device 204 may provide an indication to the user 202 of the translation mode and the stop command. For example, the user interface generator 216 may generate a user interface that indicates that the computing device 204 is translating to Spanish and that the stop command is "I am done." The user interface generator 206 may provide the user interface to a display of the computing device. Alternatively, or additionally, the speech synthesizer 218 may synthesize speech that indicates that the stop command is "I am done." The speech synthesizer 218 may provide the synthesized speech to a speaker of the computing device 204.

The user 202 speaks utterances 220 and 230. The computing device 204 receives audio data corresponding to the utterances 220 and 230 through a microphone. The computing device 204 processes the audio data in a similar fashion to the audio data corresponding to utterance 206. The hotword detector 208 does not identify a hotword in the audio data corresponding to the utterances 220 or 230. The speech recognizer 210 generates the transcriptions "I am watching a movie" and "It is long."

The computing device 204 stores the transcriptions of the received audio data in the received text 236. The received text 236 may store a timestamp along with each transcription. For example, the received text 236 may store "I am watching a movie" with timestamp 1/12/17 3:23:45 PM and "It is long" with timestamp 1/12/17 3:24:05 PM. In some implementations, the translation engine 224 does not translate any text stored in the received text 236 until the computing device receives a command from the user 202 that the user 202 is done speaking.

The user 202 speaks utterance 234. The computing device 204 receives audio data corresponding to the utterance 234 through a microphone. The computing device 204 processes the audio data in a similar fashion to the audio data corresponding to utterances 206, 220, and 230. The hotword detector 208 identifies the predefined hotword "OK computer." The speech recognizer 210 generates the transcription, "I am done."

In response to detecting the predefined hotword, the computing device 204 provides the transcription to the translation mode selector 212. The translation mode selector 212 accesses the translation mode status 214 and updates the translation mode 214 based on the received transcription. The transcription may indicate to stop the translation mode if the transcription matches stop command. In instances where the transcription does not match the stop command, the user interface generator 216 may generate a user interface reminding the user of the stop command and provide the user interface to the display of the computing device 204. Alternatively, or additionally, the speech synthesizer 218 may synthesize speech reminding the user of the stop command and provide the synthesized speech to the speaker of the computing device 204. With the transcription not matching the stop command, the translation mode selector 212 maintains the translation mode status 214 as translating to Spanish.

In the example shown in FIG. 2, the translation mode selector 212 determines that the transcription "I am done" matches the stop command stored in the translation mode status 214. The translation mode selector 212 updates the translation mode to not translating and initializes the translation of the text stored in the received text 236, which is "I am watching a movie" and "It is long," from English to Spanish.

The translation engine 224 access the text stored in the received text 236 and generates a translation in response to the command to translate the text from English to Spanish. The translation engine 224 translates the text in a similar fashion to how the translation engine 124 translates "I am watching a movie. It is long," as described above. The translation engine 224 determines a context of the initial portion of the transcription and uses the context to improve the translation accuracy of later portions of the transcription.

In this example, the translation engine 224 translates "I am watching a movie. It is long" to "Estoy viendo una película. Es larga."

The computing device 204 provides the translation to the user interface generator 216 or the speech synthesizer 218 or both. The user interface generator 216 may generate a user interface of the translation and provide the user interface to a display of the computing device 204. For example, the user interface may indicate that the translation of "I am watching a movie. It is long" is "Estoy viendo una película. Es larga." The speech synthesizer 218 may synthesize speech of the translation and provide the synthesized speech to the speaker of the computing device 204. For example, the synthesized speech may output, "Estoy viendo una película. Es larga," or "The translation of 'I am watching a movie. It is long.' is 'Estoy viendo una película. Es larga.'" The computing device 204 also clears the text stored in the received text 236.

In some implementations, the computing device 204 may only wait for a particular period of time after receiving text to translate. If the particular period of time elapses and the computing device 204 has not received a stop command, then the computing device 204 may translate the text stored in the received text 236. For example, the user 202 speaks utterance 220. The computing device stores the corresponding text in the received text 236. After one minute the computing device 204 may determine that the user 202 has likely stopped speaking and proceed to translate the transcription of utterance 220. In some implementations, the computing device 204 may prompt either on the display or audibly whether the user 202 would like to receive a translation of the text. If the user 202 responds in the affirmative, then the computing device 204 provides the translation. If the user 202 does not provide an affirmative response, then the computing device 204 may clear the received text 236 and set the translation mode status to not translating.

In some implementations, the user 202 may provide text to translate to the computing device 204 in other ways besides speaking. For example, the user 202 may enter the text using a keyboard of the computing device 204. The user may link to a document that includes the text. In some implementations, the interface may include selectable options for the user to initialize translation of the entered text.

Figure 3:
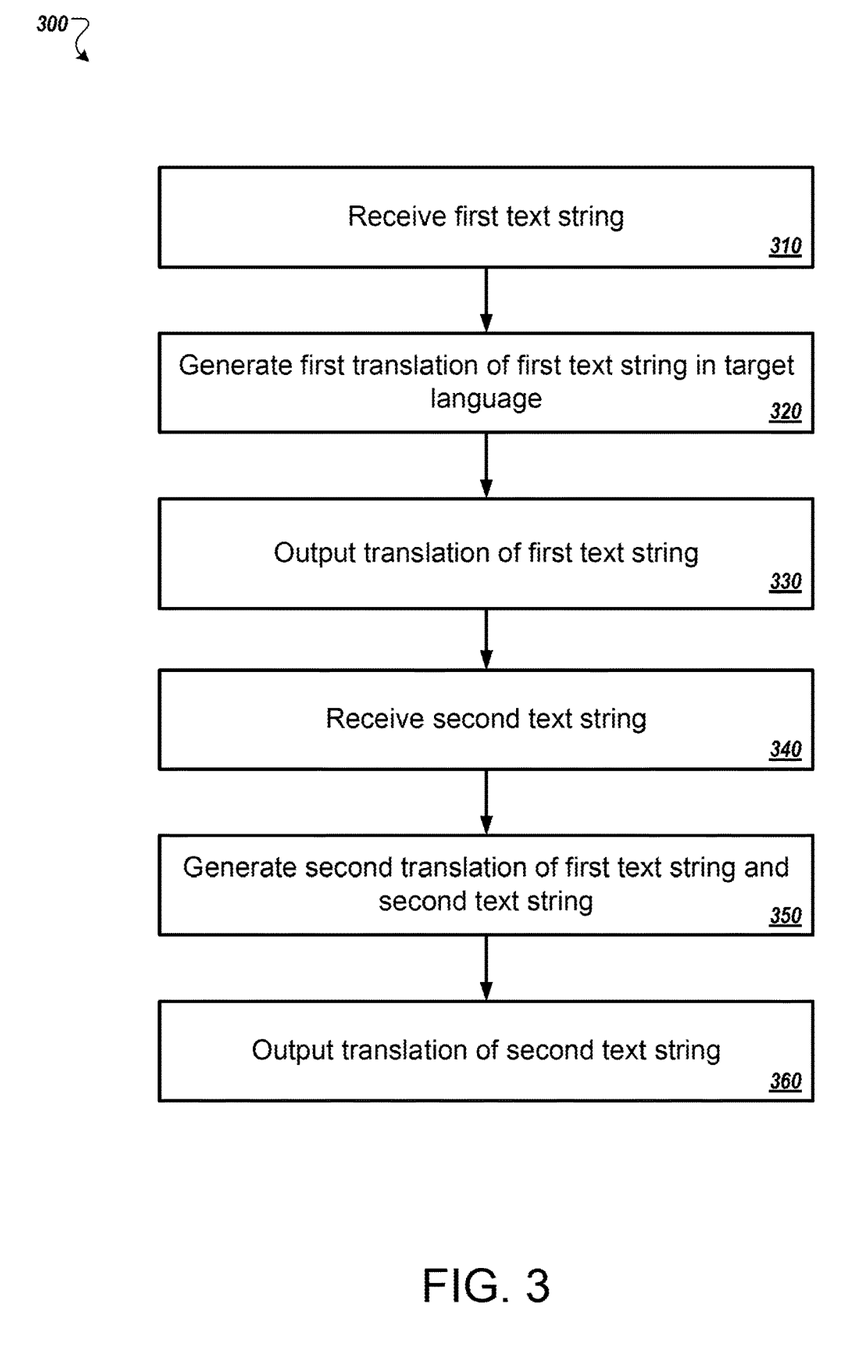
FIGS. 3 and 4 illustrate example processes for contextual language translation.

FIG. 3 illustrates an example process 300 for contextual language translation. In general, the process 300 receives text in one language and translates the text into another language using the context previously inputted text. The process 300 will be described as being performed by a computer system comprising one or more computers, for example, system 100 as shown in FIG. 1 or system 200 as shown in FIG. 2.

The system receives a first text string (310). In some implementations, the system initially receives a command to enter a mode for translating text strings into a target language. For example, the command may be "start translating English to Spanish." In some implementations, the system receives the first text string by transcribing audio data corresponding to a user utterance. For example, a user may speak, "I am watching a movie," and the system may generate the corresponding transcription of the user's speech.

In some implementations, the command to enter the translation mode is preceded by a predefined hotword. For example, a user may speak, "Ok computer, start translating English to Spanish." The system identifies the hotword and command and enters the translation mode. In the translation mode, the system is configured to translate received text or received speech that is not preceded by the predefined hotword. If the system detects the predefined hotword, then the system processes the following text or speech as a command to change the translation mode.

In some implementations, the system may be a dedicated translation system that does not require an initial command. For example, the system may be configured to translate any received speech or text from a source language to a target language. The system may be configurable for different source and target languages. The system may also be configured to automatically detect a source language.

The system generates a first translation of the first text string in a target language (320). In some implementations, the system stores the translation of the first text string and the first text string. The system provides, for output, the translation of the first text string (330). In some implementations, the system outputs the translation of the first text string on a display of the system and/or audibly. In some implementations, the system displays a selectable option that the user can select to exit the translation mode.

The system receives a second text string (340). In some implementations, the system receives the first text string by transcribing audio data corresponding to a user utterance. For example, a user may speak, "I am watching a movie," and the system may generate the corresponding transcription of the user's speech.

The system generates a second translation of the first text string and the second text string in the target language (350). In some implementations, the system generates the translation of the second text string using the context of the first text string. For example, the first text string may be "I am watching a movie." The translation of the first text string is "Estoy viendo una película." The system stores the context of the first text string and the translation of the first text string. The context may include verb tenses, whether nouns are plural or singular, the gender of words, and any other similar information. The system may use this context to translate the second text string. For example, the second text string may be "It is long." The system may determine that the pronoun "it" refers to "the movie" and its translation "una película," which is a feminine noun. Because "long" modifies "una película," which is a feminine noun, long should be in its feminine form, "larga." The translation of "It is long" is "Es larga." In some implementations, even though the system may store the first text string and the translation of the first text string, the system may translate the first text string in combination with the second text string without accessing the stored translation of the first text string.

The system provides, for output, the translation of the second text string (360). In some implementations, the system does not output the translation of the first text string with the second text string. For example, the system may translate "I am watching a movie. It is long" to "Estoy viendo una película. Es larga," and output "Es larga" without "Estoy viendo una película." In some implementations, the system only outputs the translation of the second text string. In some implementations, the system outputs the translation of the second text string on a screen of the system or audibly using a speech synthesizer.

In some implementations, the system receives a command to exit the translation mode. The command may be preceded by a predefined hotword. For example, the user may speak, "Ok computer, stop translating." The system detects "ok computer" hotword and processes the command to stop translating. If the system then receives a third text string, then the system will not translate the third text string because the system is not in translation mode.

Figure 4:
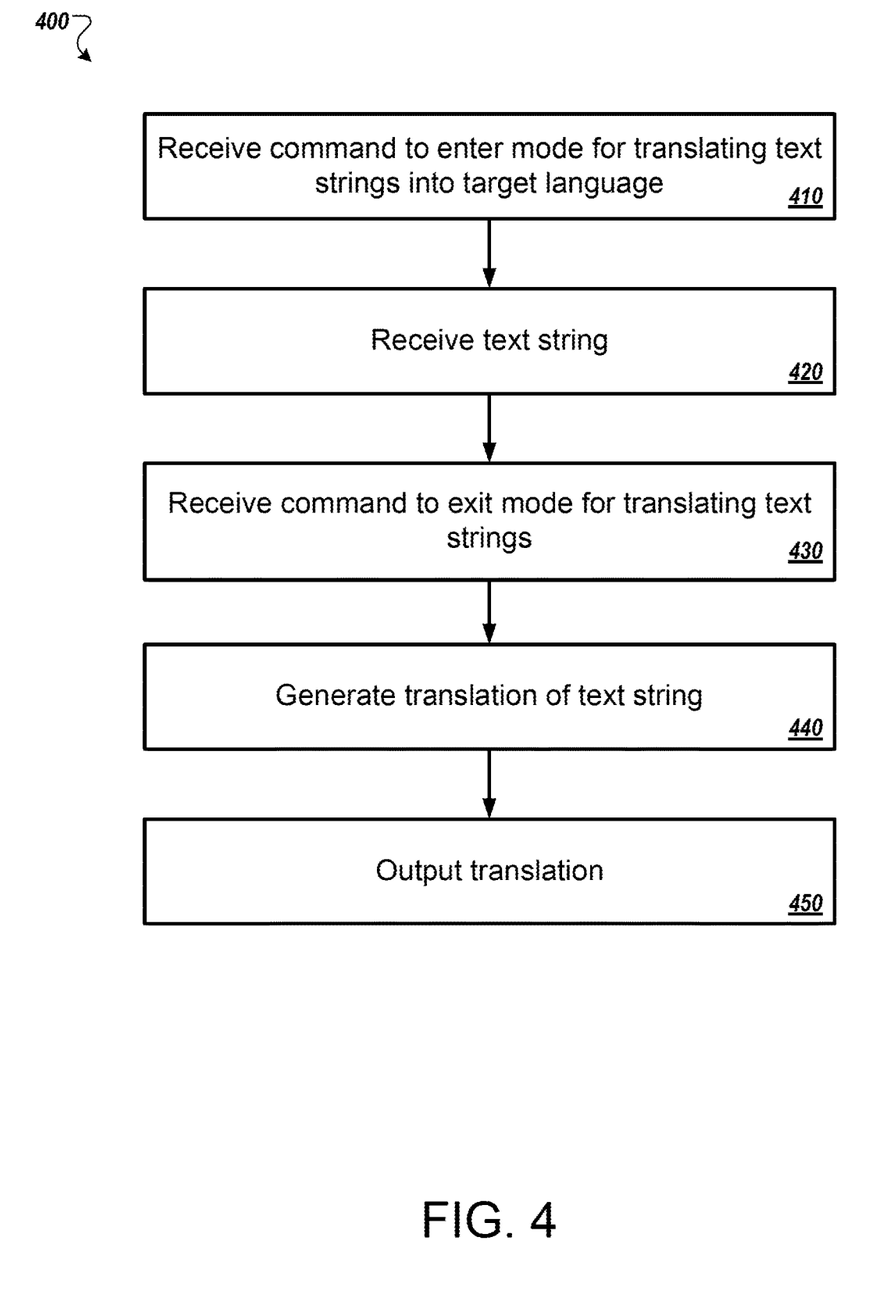

FIG. 4 illustrates an example process 400 for contextual language translation. In general, the process 400 receives text in one language and translates the text into another language using the context of the text after received a command indicating that the user has stopped providing text for translation. The process 400 will be described as being performed by a computer system comprising one or more computers, for example, system 100 as shown in FIG. 1 or system 200 as shown in FIG. 2.

The system receives a command to enter a mode for translating text strings into a target language (410). In some implementations, the command to enter the translation mode is preceded by a predefined hotword. For example, a user may speak, "OK computer, translate to Spanish and wait until I say I am done." The system identifies the hotword and command and enters the translation mode. In some implementations, the command includes a stop command, for example, "wait until I say I am done." In this instance, the system stores the stop command, "I am done" to compare to text received in the future. In some implementations, the user may not include a stop command. In this instance, the system may select a default stop command such as "stop translating." In some implementations, the system may display the stop command and/or audibly provide the stop command to the user.

In some implementations, the system may generalize the user's request to wait to translate until the user says to return the translation. The system may return the translation if the system receives a command that the system interprets as likely indicating that the user has finished speaking. For example, the user may say, "OK computer, translate to Spanish until I say I am done." The system may determine that the user has likely finished speaking if the user says, "That's it for now."

The system receives a text string (420). In some implementations, the system receives the text string from a speech recognizer that transcribes the user's speech. In some implementations, the system receives the text string from the user entering the text into a keyboard. As an example, the user may speak, "I am watching a movie," followed by, "It is long." In some implementations, the system receives multiple text stings.

The system receives a command to exit the mode for translating text strings into the target language (430). The command may be preceded by a predefined hotword. For example, the user may speak, "OK computer, I am done." The system compares the transcription of the utterance after the hotword to the stop commands. The system determines that "I am done" matches the specified stop command. In some implementations, the system may automatically exit the translation mode if the system does not receive any additional text strings within a predetermined period of time. For example, the system may exit the mode for translating text strings in response to not receiving an additional text string within a two-minute period. In some implementations, the system may provide visual or audible indication that the system is exiting the translation mode.

The system generates a translation of the text string (440). In some implementations, the system generates the translation of the text string using the context of initial portions of the text string. For example, the text string may be "I am watching a movie. It is long." The translation of the first portion of the text string is "Estoy viendo una película." The system may use the context of the initial portion of the text string to translate subsequent portions of the text string. The context may include verb tenses, whether nouns are plural or singular, the gender of words, and any other similar information. For example, the subsequent portion of the text string may be "It is long." The system may determine that the pronoun "it" refers to "the movie" and its translation "una película," which is a feminine noun. Because "long" modifies "una película," which is a feminine noun, long should be in its feminine form, "larga." The translation of "It is long" is "Es larga." In this example, the translation of the text string is "Estoy viendo una película. Es larga."

The system provides, for output, the translation of the text string (450). In some implementations, the system outputs the translation of the text string on a screen of the system or audibly using a speech synthesizer.

Figure 5:
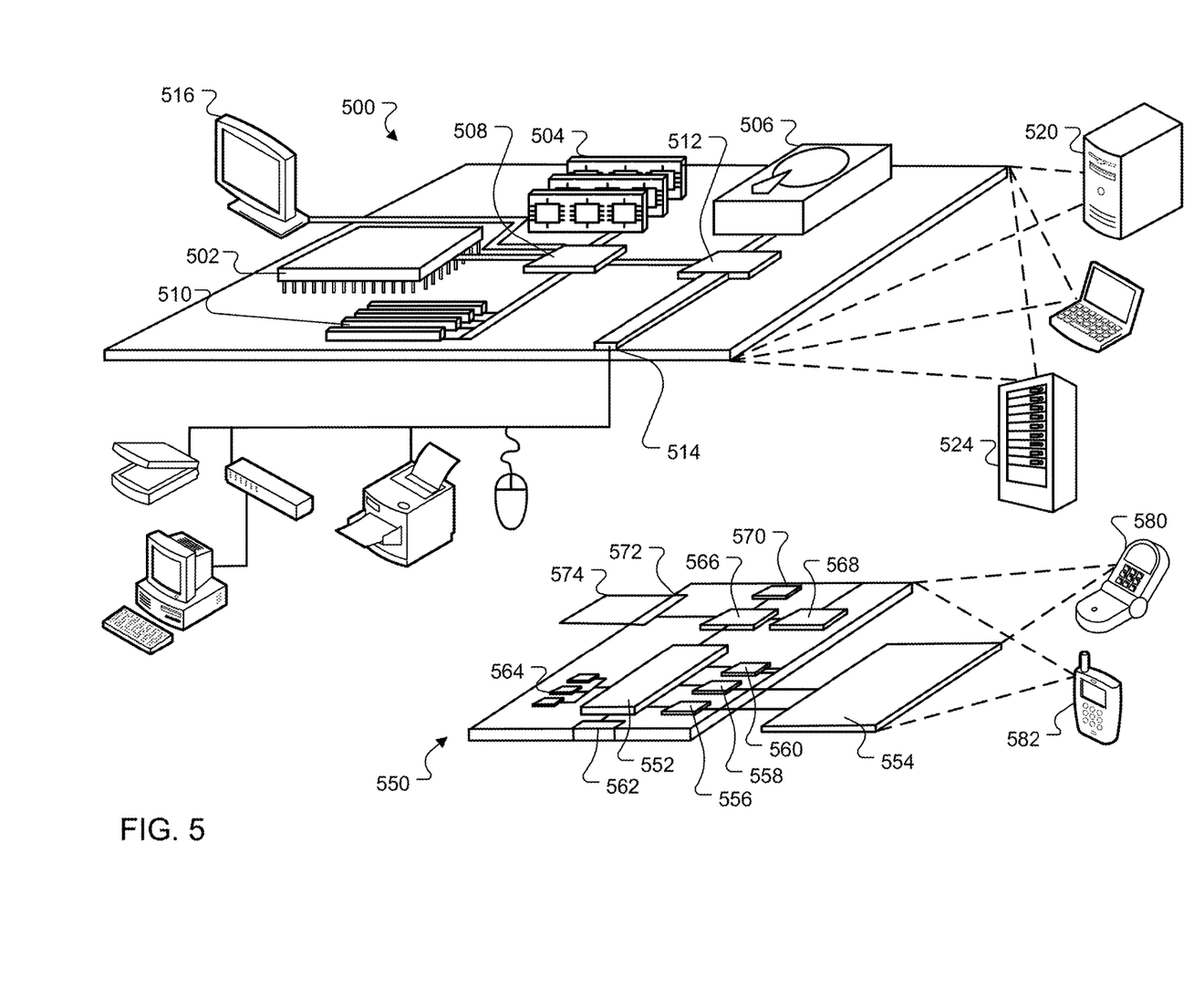
FIG. 5 illustrates an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver. In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
    receiving, by a computing device that is configured to translate text and output the translated text, a first text string that is in a first language;
    generating, by the computing device, a translation of the first text string from the first language to a second language;
    providing, for output by the computing device, the translation of the first text string;
    after providing, for output, the translation of the first text string, receiving, by the computing device, a second text string that is in the first language;
    generating, by the computing device, a combined text string by combining the first text string that is in the first language and the second text string that is in the first language;
    generating, by the computing device, a translation of the combined text string from the first language to the second language;
    providing, for output by the computing device, a portion of the translation of the combined text string that includes a translation of the second text string; and
    bypassing, by the computing device, providing, for output, another portion of the translation of the combined text string that includes a subsequent translation of the first text string.

2. The method of claim 1, comprising:
    receiving a command to enter a mode for translating text strings from the first language to the second language, wherein the translation of the first text string and the translation of the combined text string are generated based on the command to enter the mode for translating text strings from the first language to the target language.

3. The method of claim 2, wherein:
    the command to enter the mode for translating text strings from the first language to the second language is preceded by a predefined hotword, and
    the first text string and the second text string are not preceded by the predefined hotword.

4. The method of claim 1, wherein generating a translation of the combined text string from the first language to the second language comprises:
    determining a translation context based the first text string, and
    generating the translation of the combined text string based on the translation context.

5. The method of claim 1, comprising:
    receiving a command to exit a mode for translating text strings from the first language to the second language; and
    receiving a third text string and not generating a translation of the third text string based on the command to exit the mode for translating text strings from the first language to the second language.

6. The method of claim 5, wherein the command to exit the mode for translating text strings from the first language to the second language is preceded by a predefined hotword.

7. The method of claim 1, wherein generating a combined text string by combining the first text string that is in the first language and the second text string that is in the first language comprises:
concatenating the first text string that is in the first language and the second text string that is in the first language.

8. A system comprising:
one or more computers and one or more storage devices storing instructions that are operable, when executed by the one or more computers, to cause the one or more computers to perform operations comprising:
receiving, by a computing device that is configured to translate text and output the translated text, a first text string that is in a first language;
generating, by the computing device, a translation of the first text string from the first language to a second language;
providing, for output by the computing device, the translation of the first text string;
after providing, for output, the translation of the first text string, receiving, by the computing device, a second text string that is in the first language;
generating, by the computing device, a combined text string by combining the first text string that is in the first language and the second text string that is in the first language;
generating, by the computing device, a translation of the combined text string from the first language to the second language;
providing, for output by the computing device, a portion of the translation of the combined text string that includes a translation of the second text string; and
bypassing, by the computing device, providing, for output, another portion of the translation of the combined text string that includes a subsequent translation of the first text string.

9. The system of claim 8, wherein the operations further comprise:
receiving a command to enter a mode for translating text strings from the first language to the second language, wherein the translation of the first text string and the translation of the combined text string are generated based on the command to enter the mode for translating text strings from the first language to the target language.

10. The system of claim 9, wherein:
the command to enter the mode for translating text strings from the first language to the second language is preceded by a predefined hotword, and
the first text string and the second text string are not preceded by the predefined hotword.

11. The system of claim 8, wherein generating a translation of the combined text string from the first language to the second language comprises:
determining a translation context based the first text string, and
generating the translation of the combined text string based on the translation context.

12. The system of claim 8, wherein the operations further comprise:

receiving a command to exit a mode for translating text strings from the first language to the second language; and
receiving a third text string and not generating a translation of the third text string based on the command to exit the mode for translating text strings from the first language to the second language.

13. The system of claim 12, wherein the command to exit the mode for translating text strings from the first language to the second language is preceded by a predefined hotword.

14. The system of claim 8, wherein generating a combined text string by combining the first text string that is in the first language and the second text string that is in the first language comprises:
concatenating the first text string that is in the first language and the second text string that is in the first language.

15. A non-transitory computer-readable medium storing software comprising instructions executable by one or more computers which, upon such execution, cause the one or more computers to perform operations comprising:
receiving, by a computing device that is configured to translate text and output the translated text, a first text string that is in a first language;
generating, by the computing device, a translation of the first text string from the first language to a second language;
providing, for output by the computing device, the translation of the first text string;
after providing, for output, the translation of the first text string, receiving, by the computing device, a second text string that is in the first language;
generating, by the computing device, a combined text string by combining the first text string that is in the first language and the second text string that is in the first language;
generating, by the computing device, a translation of the combined text string from the first language to the second language;
providing, for output by the computing device, a portion of the translation of the combined text string that includes a translation of the second text string; and
bypassing, by the computing device, providing, for output, another portion of the translation of the combined text string that includes a subsequent translation of the first text string.

16. The medium of claim 15, wherein the operations further comprise:
receiving a command to enter a mode for translating text strings from the first language to the second language, wherein the translation of the first text string and the translation of the combined text string are generated based on the command to enter the mode for translating text strings from the first language to the target language.

17. The medium of claim 16, wherein:
the command to enter the mode for translating text strings from the first language to the second language is preceded by a predefined hotword, and
the first text string and the second text string are not preceded by the predefined hotword.

18. The medium of claim 15, wherein generating a translation of the combined text string from the first language to the second language comprises:
determining a translation context based the first text string, and generating the translation of the combined text string based on the translation context.

19. The medium of claim 15, wherein the operations further comprise:
   receiving a command to exit a mode for translating text strings from the first language to the second language; and
   receiving a third text string and not generating a translation of the third text string based on the command to exit the mode for translating text strings from the first language to the second language.

20. The medium of claim 15, wherein generating a combined text string by combining the first text string that is in the first language and the second text string that is in the first language comprises:
   concatenating the first text string that is in the first language and the second text string that is in the first language.

\* \* \* \* \*